(12) United States Patent
Chang

(10) Patent No.: US 9,743,541 B1
(45) Date of Patent: Aug. 22, 2017

(54) ELECTRONIC DEVICE FOR FAST ASSEMBLING AND CONNECTING

(71) Applicant: JET OPTOELECTRONICS CO., LTD., Taipei (TW)

(72) Inventor: Yung-Tse Chang, Taipei (TW)

(73) Assignee: JET OPTOELECTRONICS CO., LTD., Taipei (TW)

( * ) Notice: Subject to any disclaimer, the term of this patent is extended or adjusted under 35 U.S.C. 154(b) by 0 days.

(21) Appl. No.: 15/190,154

(22) Filed: Jun. 22, 2016

(51) Int. Cl.
*H05K 7/02* (2006.01)
*H05K 7/04* (2006.01)
*H05K 5/02* (2006.01)

(52) U.S. Cl.
CPC ......... *H05K 5/0204* (2013.01); *H05K 5/0217* (2013.01); *H05K 5/0247* (2013.01)

(58) Field of Classification Search
CPC ... H05K 5/0204; H05K 5/0217; H05K 5/0247
USPC ........................................ 361/807, 809, 810
See application file for complete search history.

(56) References Cited

U.S. PATENT DOCUMENTS

| | | | | |
|---|---|---|---|---|
| 4,194,157 A | * | 3/1980 | Uno | H04B 1/086 312/7.1 |
| 7,748,680 B2 | * | 7/2010 | Choi | F16M 11/10 16/367 |
| 9,545,027 B2 | * | 1/2017 | Chiang | H05K 7/12 |
| 2002/0003874 A1 | * | 1/2002 | Peiker | B60R 11/0241 379/419 |
| 2011/0062299 A1 | * | 3/2011 | Tsai | F16M 11/041 248/231.41 |

\* cited by examiner

*Primary Examiner* — Hung S Bui
(74) *Attorney, Agent, or Firm* — Pai Patent & Trademark Law Firm; Chao-Chang David Pai

(57) ABSTRACT

An electronic device for fast assembling and connecting includes a holder and a monitor. The holder includes a main lever, an assembling member, a positioning member, and a signal connector. The monitor includes a rear shell body, an assembling slide and a connector. The monitor is movably installed in the holder. The assembling member is pivotally connected with the main lever. A rear shell body of the monitor includes an assembling slide and a connector. A slide portion is formed on the rear shell body. The slide portion and the assembling slide are movably installed in the assembling member. The connector is electrically connected with a signal connector of the assembling member. Accordingly, the monitor may be quickly installed in the holder. During the installation, the connector may be electrically connected with the signal connector.

11 Claims, 8 Drawing Sheets

ELECTRONIC DEVICE FOR FAST ASSEMBLING AND CONNECTING

BACKGROUND OF THE INVENTION

1. Field of the Invention

The present invention relates to an electronic device, and more particularly to an electronic device for fast assembling and connecting to achieve signal transmission.

2. Description of Related Art

With advance in technology of modern life, information broadcast may be performed at anytime and any locations. Especially for those monitors installed in vehicles, passengers may receive information, such as breaking news and so on, from those monitors in the vehicles during the transportation. The monitors in the vehicle may also be used as an entertainment medium to see a movie.

When the information broadcast is applied in a bus or a taxi, the monitors are installed on pillow holders at front seats. Therefore, the passengers may watch the information shown on the monitors. Specifically, the installation of the monitor is to include an installing mount on the pillow holder at the front seat in cooperation with installation components at rear side of the monitor. The monitor is removable from the installing mount.

During the installation procedure of the monitor in the conventional art, it is difficult for technicians to install the installation components of the monitor on the installing mount because of a blind spot within the vehicle. Moreover, a connector of the monitor is hard to be connected with a wire connector of an external signal source. It is very inconvenient to install the monitor within the vehicle. Therefore, a problem that a monitor is difficult to be installed in an installing mount and a connector is hard to be electrically connected with a signal connector of a signal source because of an internal spatial limitation in a vehicle is required to be overcome.

SUMMARY OF THE INVENTION

An objective of the present invention is to quickly couple a monitor and a holder together and at the same time to achieve a connection for transmitting signals between the monitor and the holder.

In order to achieve the aforementioned objective, an electronic device for fast assembling and connecting is disclosed in the present invention and includes a holder and a monitor. The holder includes a main lever, an assembling member, a positioning member, and a signal connector. The assembling member is a hollow elongated body, and the assembling member is pivotally connected with the main lever and has two first hooks. The two first hooks are respectively formed from a top edge and a bottom edge at a first side of the assembling member. The positioning member is movably disposed in the assembling member and retractably protrudes from the bottom edge of the assembling member. The signal connector is disposed in one end of the assembling member and configured to transmit and receive signals from a signal source.

The monitor includes a rear shell body, an assembling slide, and a connector. The rear shell body has a slide portion, and the slide portion is depressed along a lengthwise direction of the rear shell body and formed at a first side of the rear shell body. The assembling member is movable along the slide portion. The assembling slide is disposed at the rear shell body and has a receiving groove, two second hooks, and a positioning groove. The receiving groove is formed within the assembling slide and corresponds in position to the slide portion. The assembling member is movably disposed in the receiving groove. The two second hooks respectively protrude from a top edge and a bottom edge of the receiving groove, and a gap is formed between the two second hooks and a bottom surface of the receiving groove. The two first hooks are engaged with the second hooks. The positioning groove is formed in one of the two second hooks at the bottom edge of the receiving groove. The positioning groove is located at a first end of the assembling slide adjacent to the slide portion. The positioning member is embedded within the positioning groove.

The connector is fastened in the rear shell body and corresponds in position to the receiving groove of the assembling slide. The connector is opposite to the positioning groove and located at a second end of the assembling slide. The signal connector of the assembling member is detachably connected to the connector.

According to the electronic device for fast assembling and connecting, the main lever of the holder includes an assembling groove and an opening. The assembling groove is depressed along the lengthwise direction of the main lever and formed at a first side of the main lever. The opening is formed through a centre at a second side of the main lever and communicates with the assembling groove.

According to the electronic device for fast assembling and connecting, the holder further includes an assembling block, an attaching member, and a coupling member. The assembling block is disposed at a centre of the assembling groove of the main lever. The assembling block has a chamber formed through one side of the assembling block and the chamber corresponds in position to the opening.

The attaching member has a joining portion and a first pivoting member. The joining portion is disposed at a first end of the attaching member. The first pivoting member is formed at a second end of the attaching member. The coupling member has two second pivoting members and a pivot.

The two second pivoting members are separately disposed at a first side wall of the coupling member, and a second side wall of the coupling member is fastened at a second side of the assembling member. The pivot is disposed in the two second pivoting members, and the pivot is inserted into the first pivoting member of the attaching member to be a pivot assembly between the assembling member and the main lever. The assembling member is inserted into the opening of the main lever and fastened within the chamber of the assembling block.

According to the electronic device for fast assembling and connecting, the assembling member of the holder further includes a first passing groove and a second passing groove. The first passing groove is formed through the second side of the assembling member where the coupling member is fastened. The second passing groove is formed through the bottom edge of the assembling member. The first passing groove and the second passing groove communicate to each other within the assembling member.

According to the electronic device for fast assembling and connecting, the two covers are respectively installed within the assembling groove at two opposite ends of the main lever.

According to the electronic device for fast assembling and connecting, the holder includes two clips respectively disposed at two sides of the assembling block and movably installed within the assembling groove.

According to the electronic device for fast assembling and connecting, the main lever of the holder includes an attaching base, and the attaching base has a through hole formed through the attaching base. The attaching base is fastened at the second side of the main lever where the opening is formed. The through hole corresponds in position to the opening. The attaching base covers an outer wall of the attaching member and the joining portion of the attaching member is mounted through the through hole.

The advantages of the present invention are: the monitor may be quickly installed in the holder by assembling the assembling member of the holder and the assembling slide of the monitor. In addition, by the pivot assembly between the assembling member of the holder and the main lever, the user may adjust the view angle of the monitor as he wishes. During the installation of the monitor in the holder, the connector of the monitor may be electrically connected with the signal connector of the holder.

DETAILED DESCRIPTION OF THE PREFERRED EMBODIMENT

These and other aspects of the embodiments herein will be better appreciated and understood when considered in conjunction with the following description and the accompanying drawings.

Figure 1:
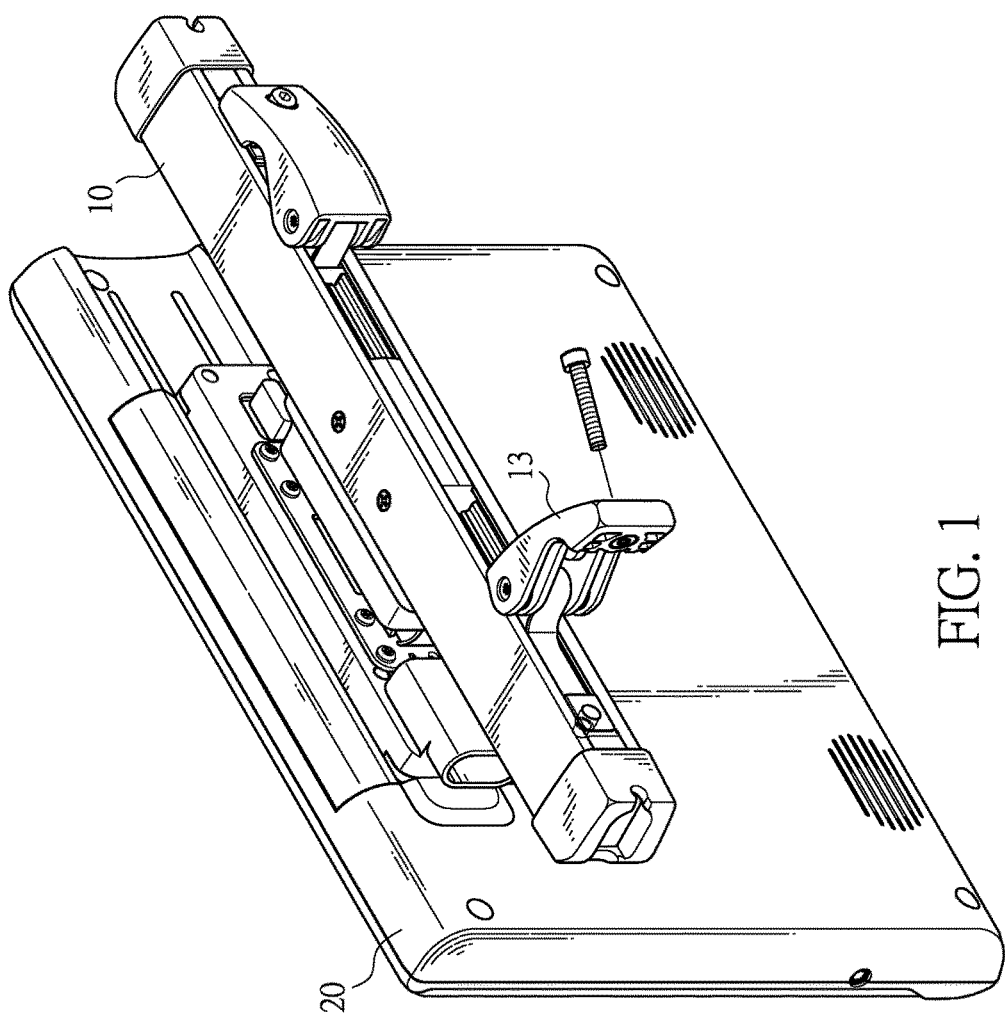
FIG. 1 is a perspective view of an electronic device for fast assembling and connecting of the present invention.

With reference to FIG. 1, an electronic device for fast assembling and connecting is disclosed in the present invention and includes a holder 10 and a monitor 20.

With reference to FIG. 4 to FIG. 8, the holder 10 includes a main lever 11, an assembling block 12, two clips 13, an attaching member 14, a coupling member 15, an assembling member 16, a positioning member 17, and a signal connector 18.

The main lever 11 includes an assembling groove 111, two covers 112, an opening 113 and an attaching base 110.

Figure 8:
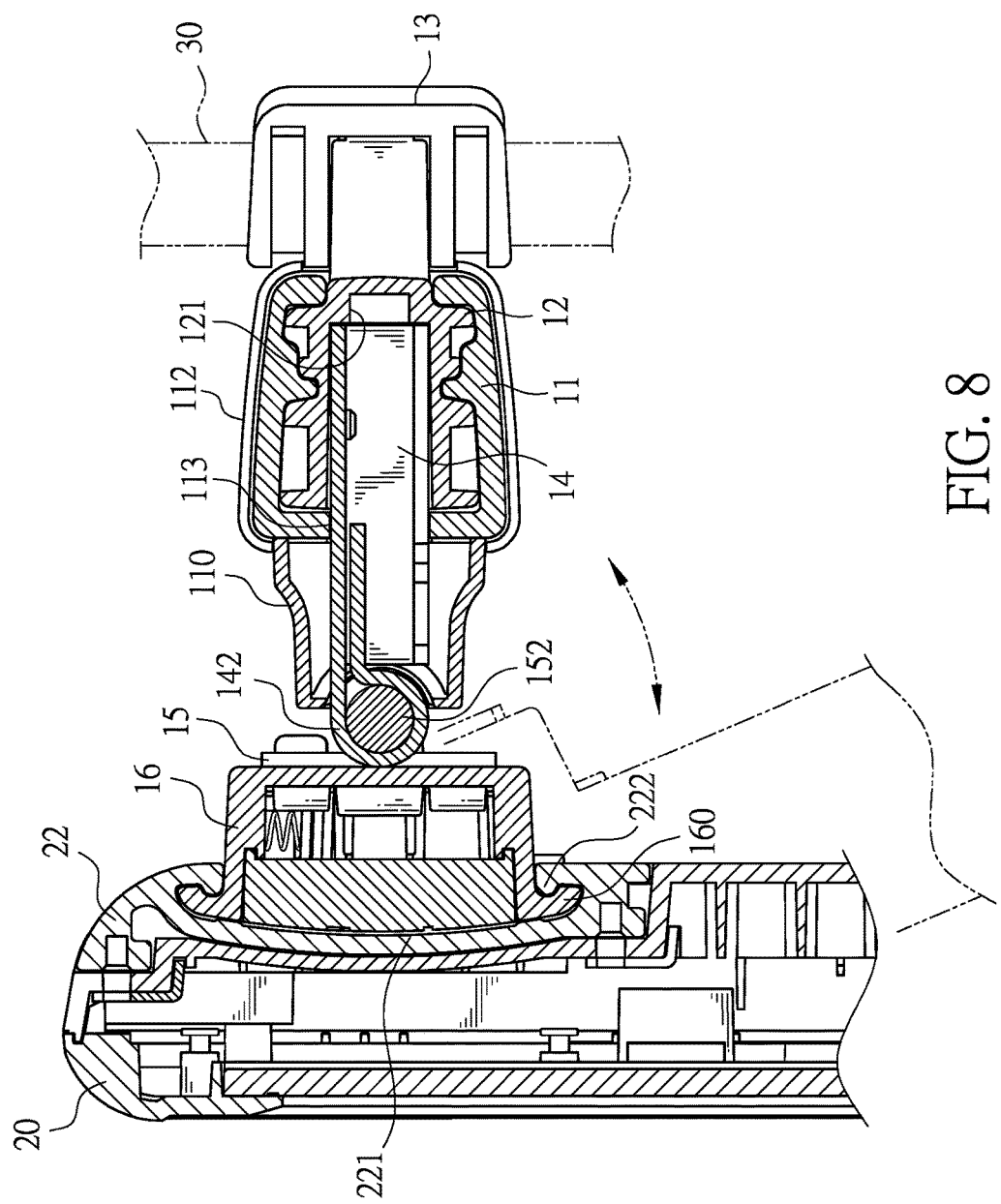
FIG. 8 is a partial sectional view of the electronic device for fast assembling and connecting in the present invention.

The main level 11 includes a first side and a second side, and the first side is opposite to the second side. The assembling groove 111 is formed along a lengthwise direction of the main lever 11 and located at the first side of the main lever 11. The two covers 112 are respectively inserted into the assembling groove 111 at two opposite ends of the main lever 11. With reference to FIG. 8, the opening 113 is formed through a centre at the second side of the main lever 11. The opening 113 communicates with the assembling groove 111. The attaching base 110 includes a through hole and the through hole is formed through the attaching base 110. The attaching base 110 is fastened at the second side of the main lever 11 where the opening 113 is formed. The through hole of the attaching base 110 corresponds in position to the opening 113.

The assembling block 12 includes a chamber 121, and the chamber 121 is formed through one side of the assembling block 12. The assembling block 12 is disposed at a centre of the first side of the assembling groove 111 of the main lever 11. The chamber 121 corresponds in position to the opening 113 of the main lever 11.

The two clips 13 are respectively disposed at two sides of the assembling block 12 and movably inserted into the assembling groove 111 of the main lever 11. As the embodiment shown in figures, the clips 13 include protrusive sliding tracks, so the clips 13 may slidaly move along the assembling groove 111. Specifically, the two clips 13 are used to fasten the pillow holder at a front seat of a vehicle. In addition, the clips 13 may be adjusted to be moved within the assembling groove 111 by the user so as to adjust a distance between the two clips 13.

Figure 6:
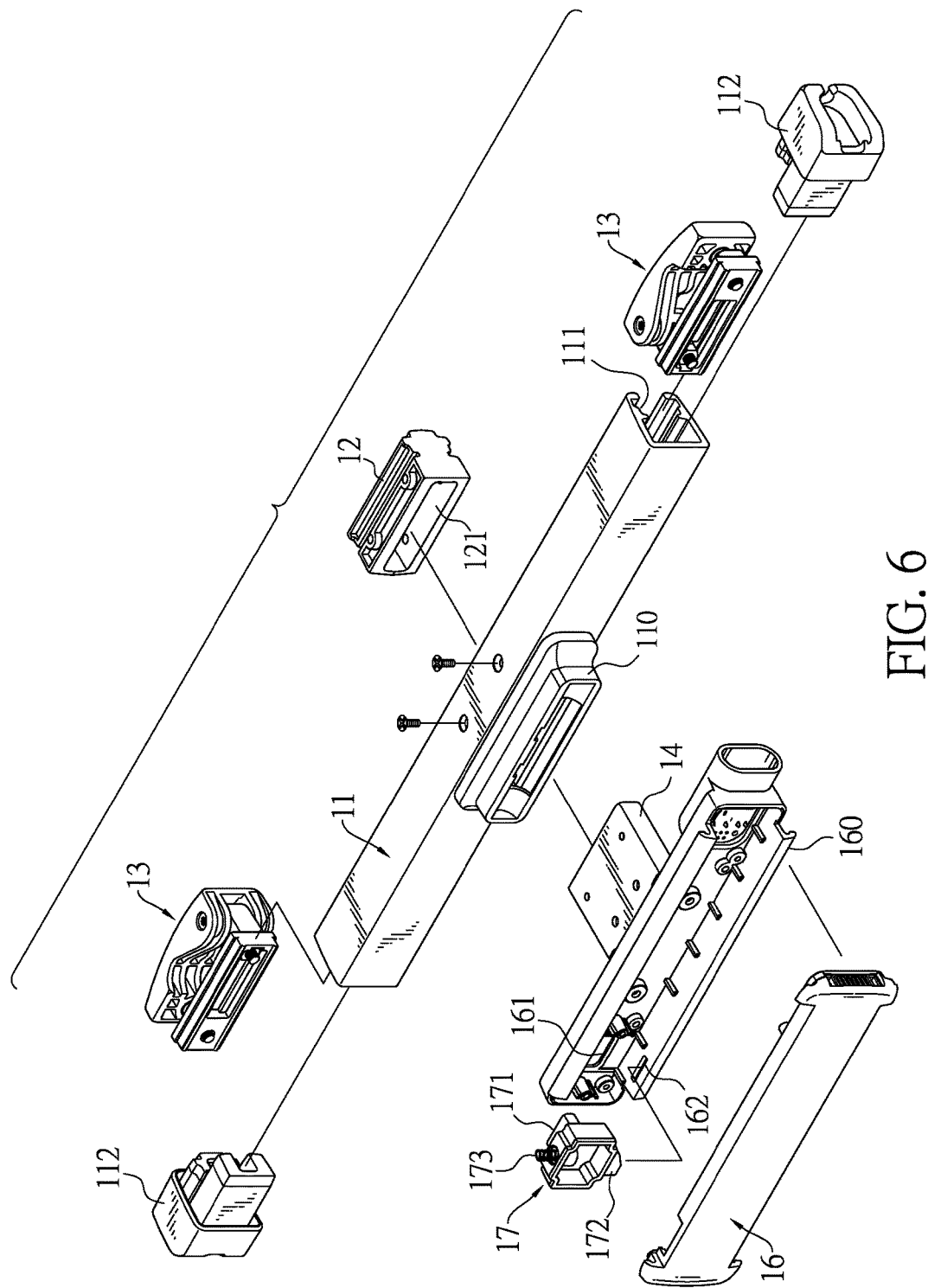
FIG. 6 is an explored view of the holder in the present invention.
Figure 7:
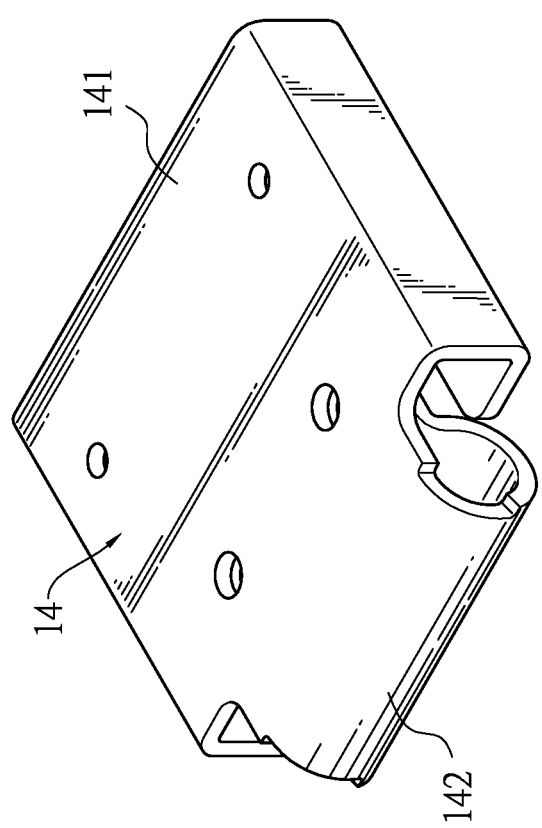
FIG. 7 is a perspective view of an attaching member in the present invention.

With reference to FIG. 6 to FIG. 8, the attaching member 14 includes a joining portion 141 and a first pivoting member 142. The attaching member 14 has a first end and a second end, and the first end is opposite to the second end. The joining portion 141 is located at the first end of the attaching member 14. The first pivoting member 142 is formed at the second end of the attaching member 14. The attaching base 110 covers an outer wall of the attaching member 14. The joining portion 141 of the attaching member 14 is inserted into the through hole of the attaching base 111 and the opening 113 of the main lever 11. The joining portion 141 of the attaching member 14 is fastened within the chamber 121 of the assembling block 12. With reference to the embodiment shown in FIG. 6, two screws are mounted from a top surface of the main lever 11 and the assembling block 12 to the chamber 121. The two screws are fastened at the joining portion 141 of the attaching member 14.

Figure 5:
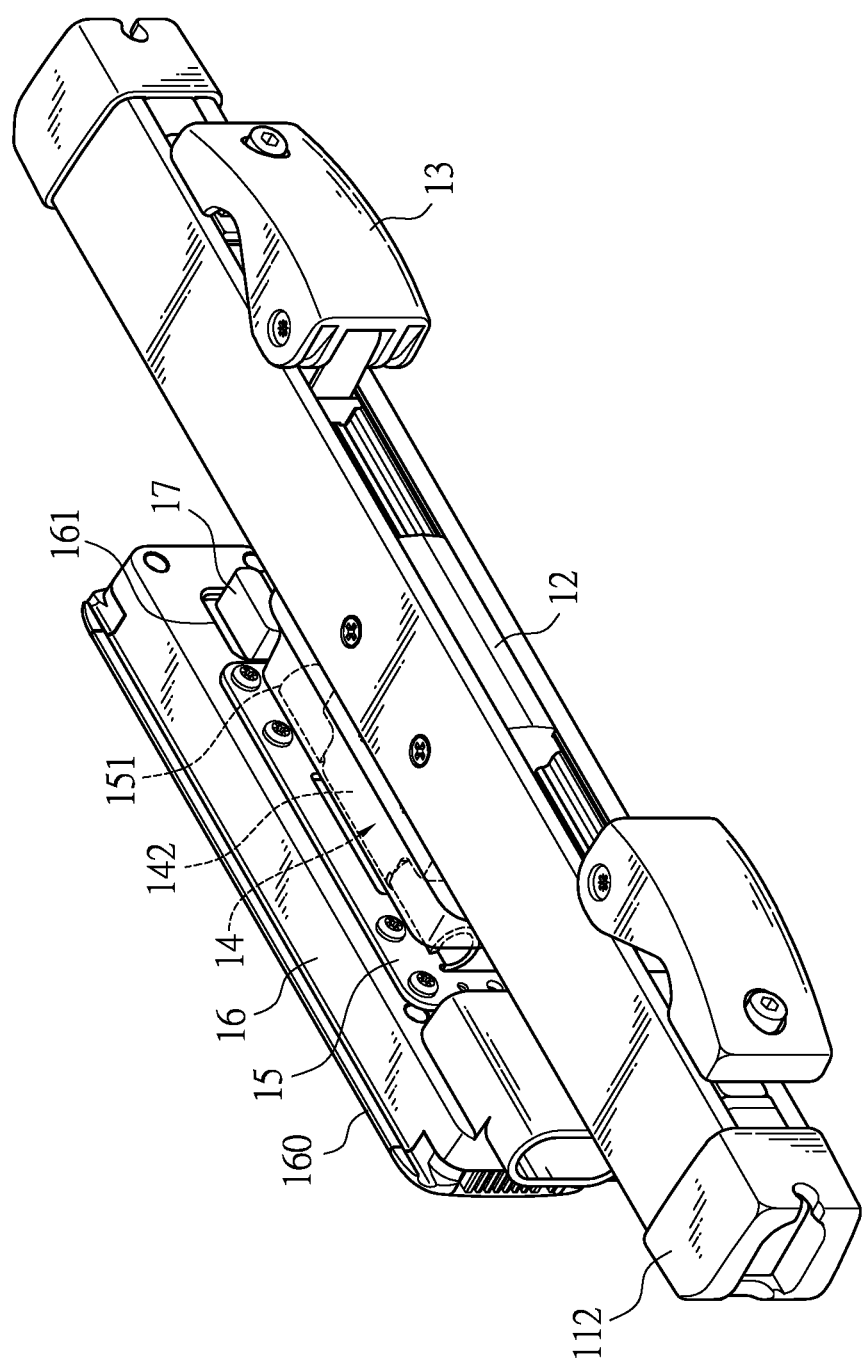
FIG. 5 is another perspective view of the holder in the present invention.

With reference to FIG. 5, FIG. 6 and FIG. 8, the coupling member 15 includes two second pivoting members 151 and a pivot 152. The two second pivoting members 151 are separately disposed at a first side wall of the coupling member 15. The pivot 152 is disposed at the two second pivoting members 151.

The assembling member 16 is a hollow elongated body, and includes a first passing groove 161, a second passing groove 162, and two first hooks 160. The first passing groove 161 and the second passing groove 162 are formed at the assembling member 16 and communicate to each other within the assembling member 16. The assembling member 16 has a first side and a second side, and the first side is opposite to the second side. The two first hooks 160 respectively protrude from a top edge and a bottom edge at the first side of the assembling member 16. A second side wall of the coupling member 15 is fastened at the second side of the assembling member 16. The pivot 152 is inserted into the first pivoting member 142 of the attaching member 14 to be a pivot assembly between the assembling member 16 and the main lever 11. Specifically, the first passing groove 161 is formed through the second side of the assembling member 16 where the coupling member 15 is fastened. The second passing groove 162 is formed through the bottom edge of the assembling member 16.

The positioning member 17 includes a switch 171, a coupling portion 172, and a spring 173. The switch 171 is formed at one side of the positioning member 17. The coupling portion 172 protrudes from the bottom of the positioning member 17. The spring 173 is disposed on a top surface of the positioning member 17. The positioning member 17 is movably installed within the assembling member 16 and protrudes from the bottom edge of the assembling member 16. Specifically, the switch 171 is inserted into the first passing groove 161 of the assembling member 16 and protrudes from the second side of the assembling member 16. The coupling portion 172 is inserted into the second passing groove 162 and protrudes from the bottom edge of the assembling member 16. The spring 173 abuts upon a top edge within an inner wall of the assembling member 16 to force the coupling portion 172 to protrude from the bottom edge of the assembling member 16.

Figure 4:
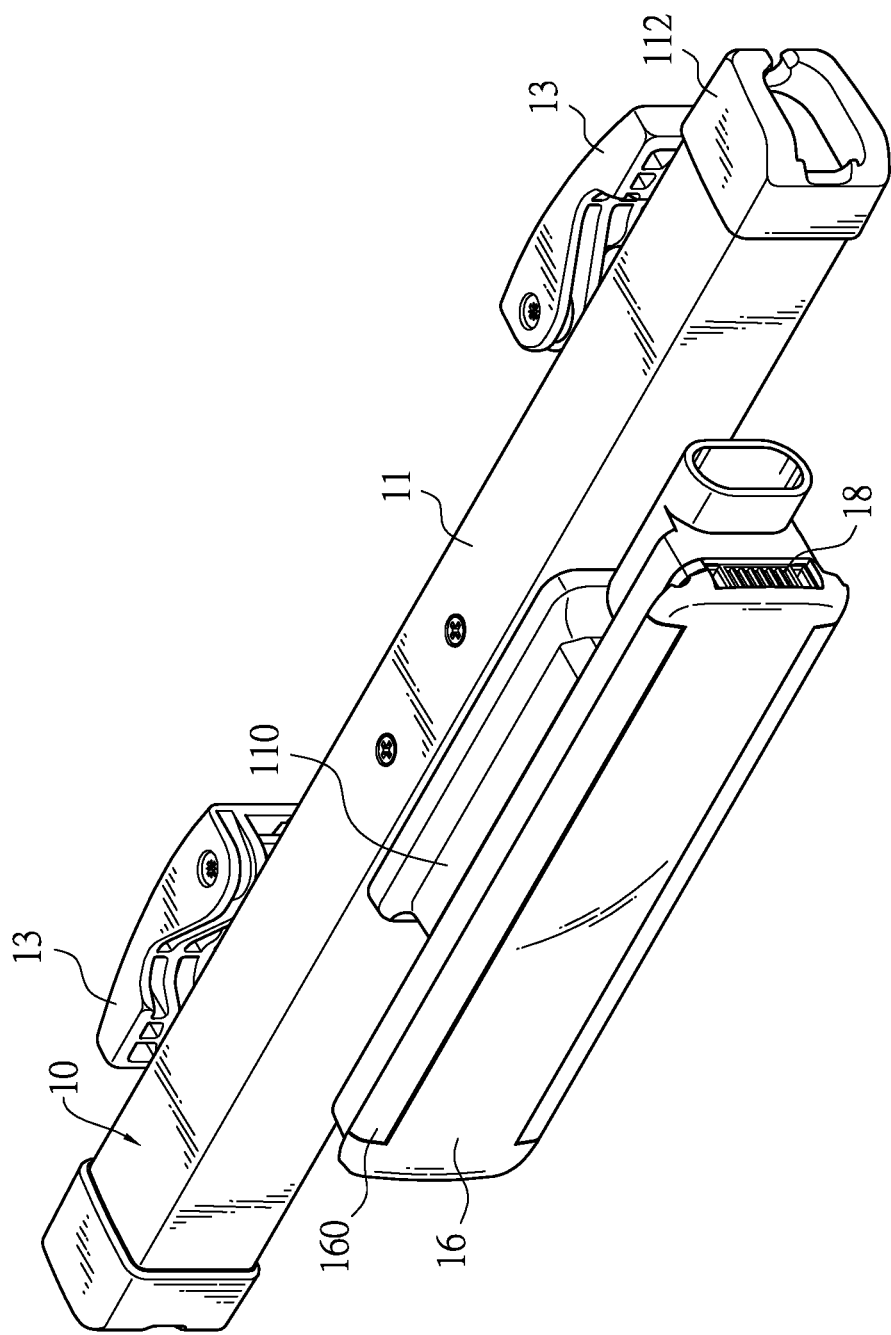
FIG. 4 is a perspective view of the holder in the present invention.

With reference to FIG. 4, the signal connector 18 is installed at one end of the assembling member 16 and is configured to transmit and receive signals from an external signal source.

Figure 2:
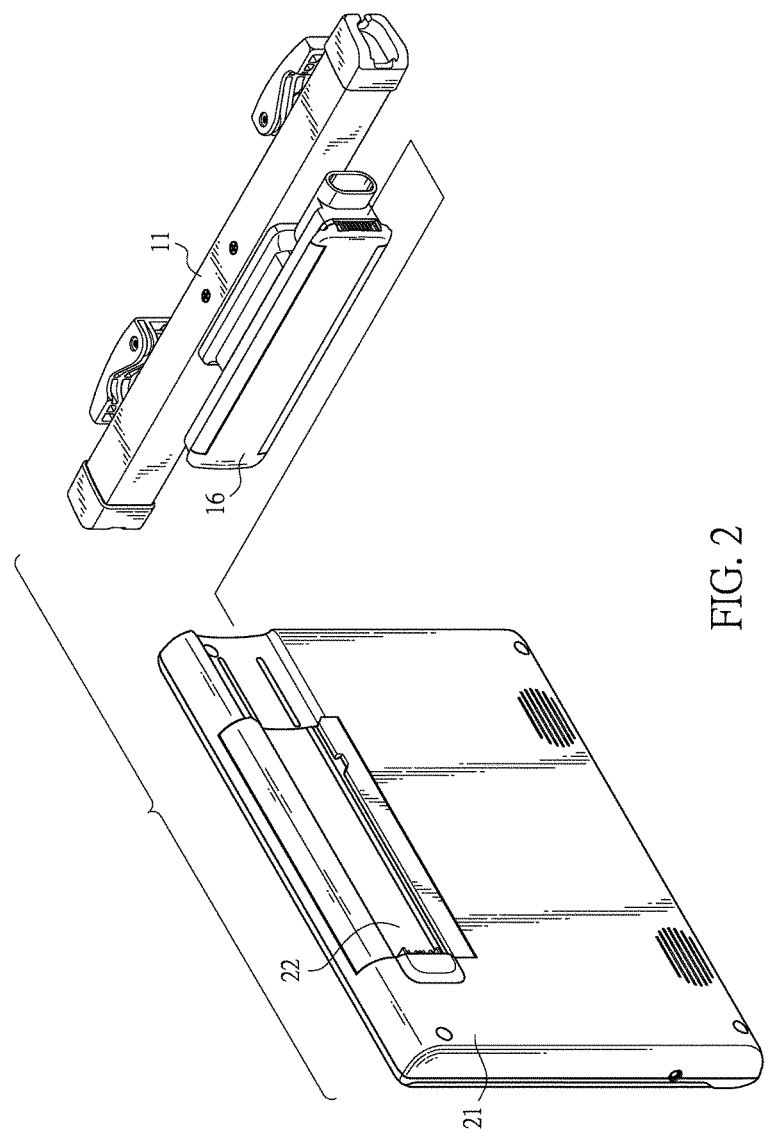
FIG. 2 is an explored perspective view of a holder and a monitor in the electronic device for fast assembling and connecting of the present invention.
Figure 3:
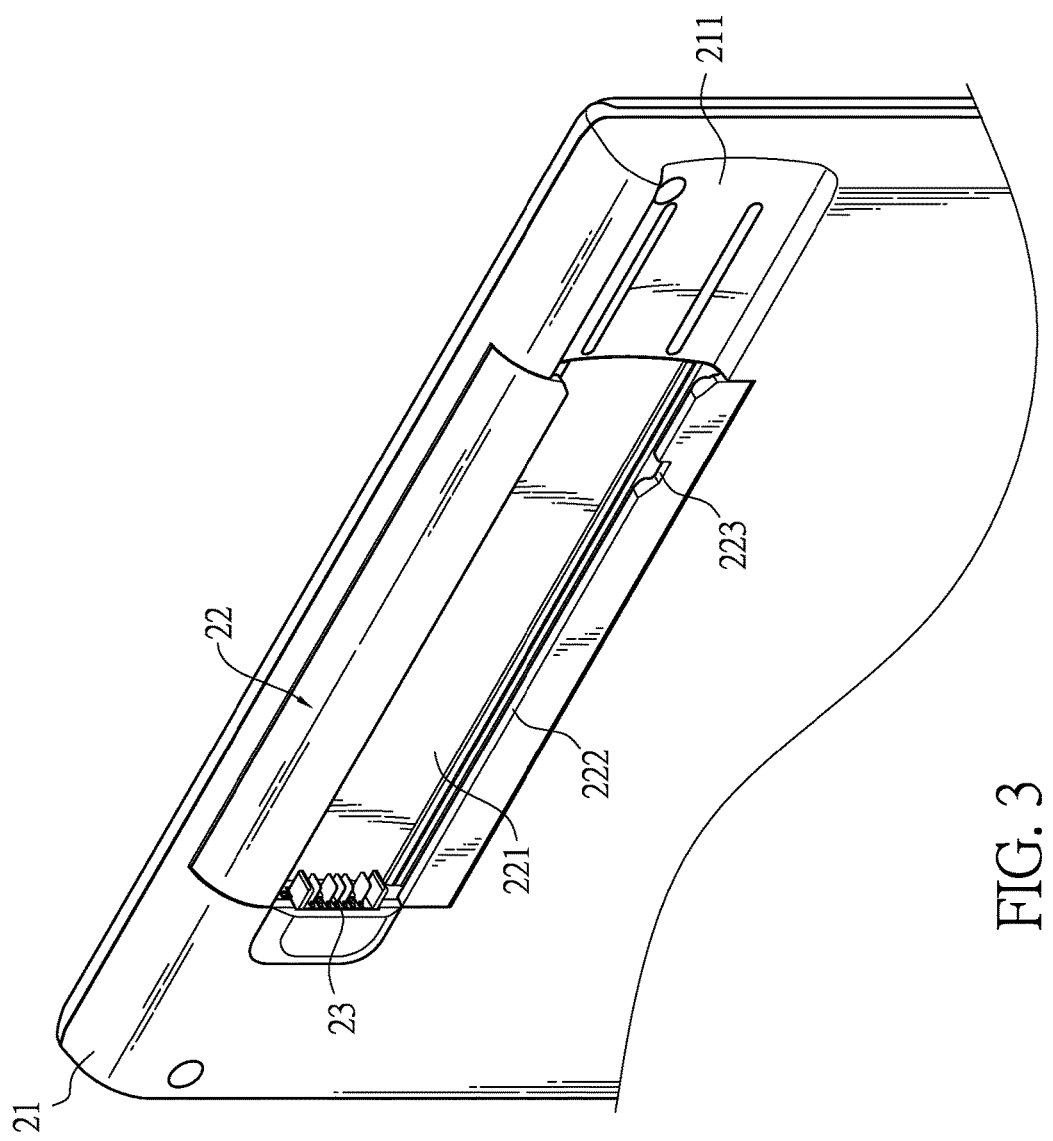
FIG. 3 is a partial perspective view of the monitor in the present invention.

With reference to FIG. 2, FIG. 3 and FIG. 8, the monitor 20 includes a rear shell body 21, an assembling slide 22 and a connector 23.

The rear shell body 21 includes a slide portion 211 and the slide portion 211 is formed along a lengthwise direction of the rear shell body 21 and located at one side wall of the rear shell body 21. The assembling member 16 may move along the slide portion 211.

The assembling slide 22 includes a receiving groove 221, two second hooks 222 and a positioning groove 223. The assembling slide 22 is disposed at the rear shell body 21.

The receiving groove 221 is formed on the assembling slide 22. The two second hooks 222 respectively protrude at a top edge and a bottom edge of the receiving groove 221. A gap is formed between the two second hooks 222 and a bottom surface of the receiving groove 221. The positioning groove 223 is formed on the second hook 222 that is at the bottom edge of the receiving groove 221. The receiving groove 221 corresponds in position to the slide portion 211 of the rear shell body 21. The assembling slide 22 has a first end and a second end. The first end is adjacent to the slide portion 211 and opposite to the second end. The positioning groove 223 is disposed at the first end of the assembling slide 22. The assembling member 16 is movably installed in the receiving groove 221. The first hooks 160 and the second hooks 222 may engage with each other. The positioning member 17 may be embedded within the positioning groove 223. Specifically, the coupling portion 172 may protrude from the bottom edge of the assembling member 16 to attach to the positioning groove 223 because the positioning member 17 is abutted by the spring 173.

The connector 23 is fastened at the rear shell body 21 and corresponds in position to the receiving groove 221 of the assembling slide 22. The connector 23 is opposite to the positioning groove 223 and located at the second end of the assembling slide 22. The signal connector 18 of the assembling member 16 is detachably connected with the connector 23.

With reference to FIG. 3, FIG. 4 and FIG. 6, in an installation procedure of the present invention, the user moves the rear shell body 21 of the monitor 20 to face the assembling member 16 and make the receiving groove 221 of the assembling slide 22 and the slide portion 211 opposite to the assembling member 16. One side of the assembling member 16 where the signal connector 18 is installed moves toward the connector 23. At the mean time, the user uses his fingers to move the switch 171 to depress the spring 173. Therefore, the coupling portion 172 retracts into the assembling member 16. The assembling member 16 moves from the slide portion 211 into the assembling slide 22. The second side of the assembling member 16 where the two first hooks 160 are formed is disposed within the receiving groove 221. The two first hooks 160 of the assembling member 16 and the two second hooks 222 of the assembling slide 22 are engaged with each other, as shown in FIG. 8.

After the assembling member 16 is completely moved within the assembling slide 22, the signal connector 18 is electrically connected with the connector 23. At the mean time, the finger of the user is removed from the switch 171 of the positioning member 17, and the spring 173 may be freely extendable. Then, the coupling portion 172 protrudes from the bottom edge of the assembling member 16 to be engaged in the positioning groove 223. Therefore, the assembling member 16 and the assembling slide 22 are fastened together.

Moreover, because of the installation of the attaching member 14 and the coupling member 15, the pivot assembly is formed between the assembling member 16 and the main lever 11. Therefore, the user may adjust a view angle of the monitor 20 as he wishes. Since the attaching base 110 covers the outer wall of the attaching member 14, most of the area of the attaching member 14 is shielded to have an aesthetically appealing appearance.

In the present invention, since the slide portion 211 of the rear shell body 21 of the monitor 20 and the assembling slide 22 may be movably installed together by the assembling member 16 of the holder 10, the monitor 20 is capable of being quickly installed on the holder 10. The main lever 11 of the holder 10 is installed on the pillow holder 30 at a front seat of a vehicle by the clips 13, as shown in FIG. 8. During the installation procedure of the monitor 20 and the holder 10, the electrical connection between the connector 23 of the monitor 20 and the signal connector 18 of the assembling member 16 may be implemented for signal transmission at the same time.

In addition, since the connector 23 is installed at the rear shell body 21 corresponding to the assembling slide 22, the connector 23 and the signal connector 18 may be shaded by the assembling member 16 after the monitor 20 is installed on the holder 10. Therefore, the connection between the connector 23 and the signal connector 18 will not be exposed from the monitor 20, and the connection between the connector 23 and the signal connector 18 is protected.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:
1. An electronic device for fast assembling and connecting, comprising:
 a holder including:
  a main lever;
  an assembling member being a hollow elongated body connected with the main lever and having two first hooks, and the two first hooks respectively formed from a top edge and a bottom edge at a first side of the assembling member;
  a positioning member movably disposed in the assembling member and retractably protruding from the bottom edge of the assembling member; and a signal connector disposed in one end of the assembling member and configured to transmit and receive signals from a signal source; and a monitor including:
  a rear shell body having a slide portion, and the slide portion formed along a lengthwise direction of the rear shell body and located at a first side of the rear shell body, and the assembling member being movable along the slide portion;
  an assembling slide disposed at the rear shell body and having:
    a receiving groove formed on the assembling slide and corresponding in position to the slide portion, and the assembling member movably disposed in the receiving groove;
    two second hooks respectively protruding from a top edge and a bottom edge of the receiving groove for engaging with the two first hooks, and a gap formed between the two second hooks and a bottom surface of the receiving groove; and
    a positioning groove formed in one of the two second hooks at the bottom edge of the receiving groove, and the positioning groove located at a first end of the assembling slide adjacent to the slide portion, and the positioning member engaged within the positioning groove; and
  a connector fastened in the rear shell body, corresponding in position to the receiving groove of the assembling slide, being opposite to the positioning groove, and located at a second end of the assembling slide, wherein the signal connector of the assembling member is detachably connected to the connector.

2. The electronic device for fast assembling and connecting as claimed in claim 1, wherein the main lever of the holder includes:
  an assembling groove formed along a lengthwise direction of the main lever and located at a first side of the main lever; and
  an opening formed through a centre at a second side of the main lever and communicating with the assembling groove.

3. The electronic device for fast assembling and connecting as claimed in claim 2, wherein the holder further includes:
  an assembling block disposed at a centre of the assembling groove of the main lever and having a chamber, wherein the chamber is formed through one side of the assembling block and corresponds in position to the opening;
  an attaching member having:
    a joining portion disposed at a first end of the attaching member; and
    a first pivoting member formed at a second end of the attaching member, and
  a coupling member having:
    two second pivoting members separately disposed at a first side wall of the coupling member, and a second side wall of the coupling member fastened at a second side of the assembling member; and
    a pivot disposed in the two second pivoting members and inserted into the first pivoting member of the attaching member to be a pivot assembly between the assembling member and the main lever;
  wherein the assembling member is inserted into the opening of the main lever and fastened within the chamber of the assembling block.

4. The electronic device for fast assembling and connecting as claimed in claim 3, wherein the assembling member of the holder further includes:
  a first passing groove formed through the second side of the assembling member where the coupling member is fastened; and
  a second passing groove formed through the bottom edge of the assembling member, and the first passing groove and the second passing groove communicating to each other within the assembling member.

5. The electronic device for fast assembling and connecting as claimed in claim 4, wherein the positioning member includes:
  a switch protruding from a first side of the positioning member and inserted into the first passing groove of the assembling member;
  a coupling portion protruding from a bottom surface of the positioning member and inserted into the second passing groove to protrude from the bottom edge of the assembling member; and
  a spring disposed on a top surface of the positioning member and abutting upon a top edge within an inner wall of the assembling member to force the coupling portion to protrude from the bottom edge of the assembling member so as to attach to the positioning groove of the assembling slide.

6. The electronic device for fast assembling and connecting as claimed in claim 5, wherein the main lever of the holder includes two covers respectively installed within the assembling groove at two opposite ends of the main lever.

7. The electronic device for fast assembling and connecting as claimed in claim 5, wherein the holder includes two clips, and the two clips are respectively disposed at two sides of the assembling block and movably installed within the assembling groove.

8. The electronic device for fast assembling and connecting as claimed in claim 7, wherein the main lever of the holder includes an attaching base having a through hole formed through the attaching base, and the attaching base is fastened at the second side of the main lever where the opening is formed, wherein the through hole corresponds in position to the opening, the attaching base covers an outer wall of the attaching member, and the joining portion of the attaching member is mounted through the through hole.

9. The electronic device for fast assembling and connecting as claimed in claim 3, wherein the main lever of the holder includes two covers respectively installed within the assembling groove at two opposite ends of the main lever.

10. The electronic device for fast assembling and connecting as claimed in claim 3, wherein the holder includes two clips, and the two clips are respectively disposed at two sides of the assembling block and movably installed within the assembling groove.

11. The electronic device for fast assembling and connecting as claimed in claim 10, wherein the main lever of the holder includes an attaching base having a through hole formed through the attaching base, and the attaching base is fastened at the second side of the main lever where the opening is formed, wherein the through hole corresponds in position to the opening, the attaching base covers an outer wall of the attaching member, and the joining portion of the attaching member is mounted through the through hole.

* * * * *